UNITED STATES PATENT OFFICE.

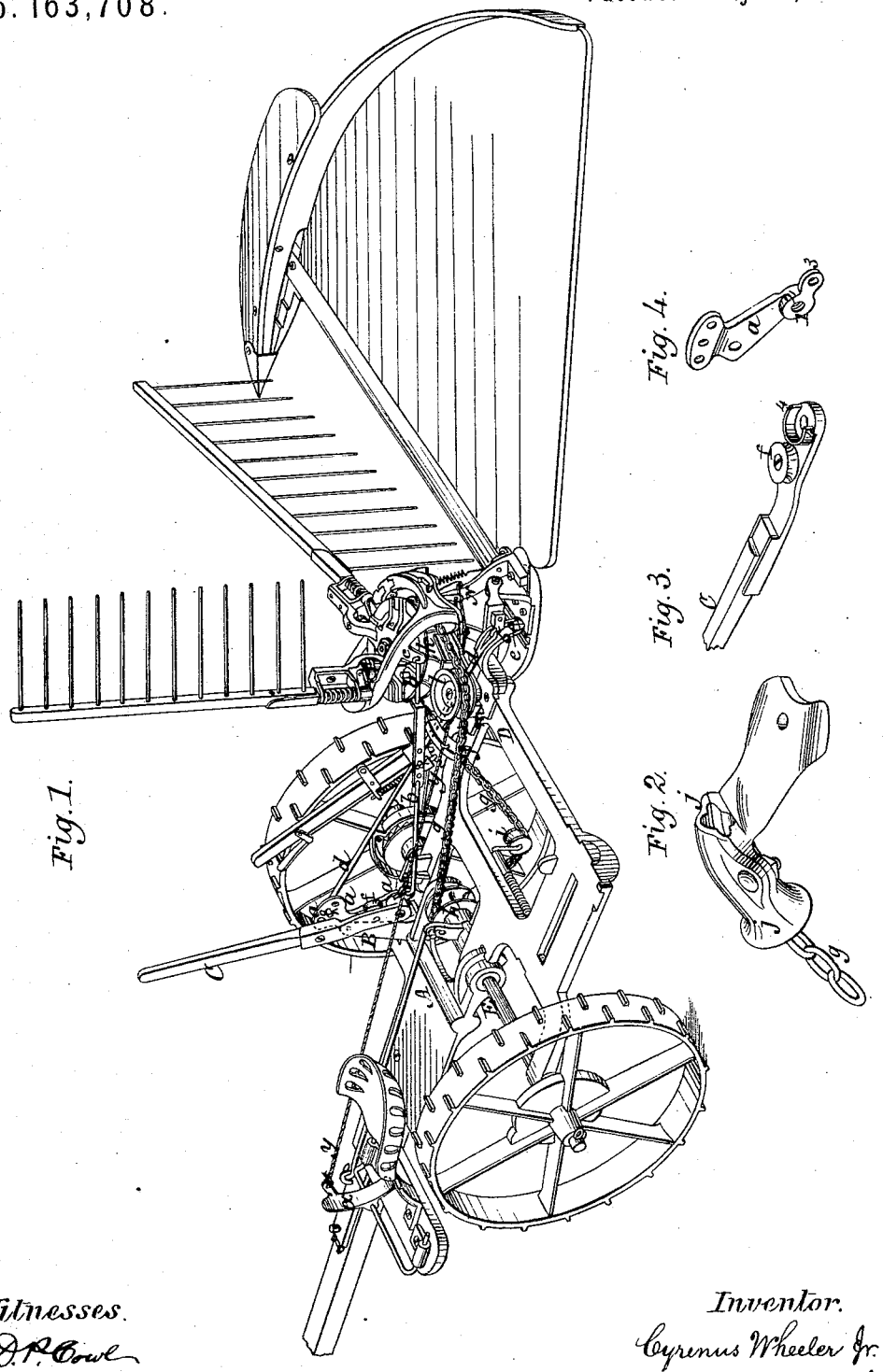

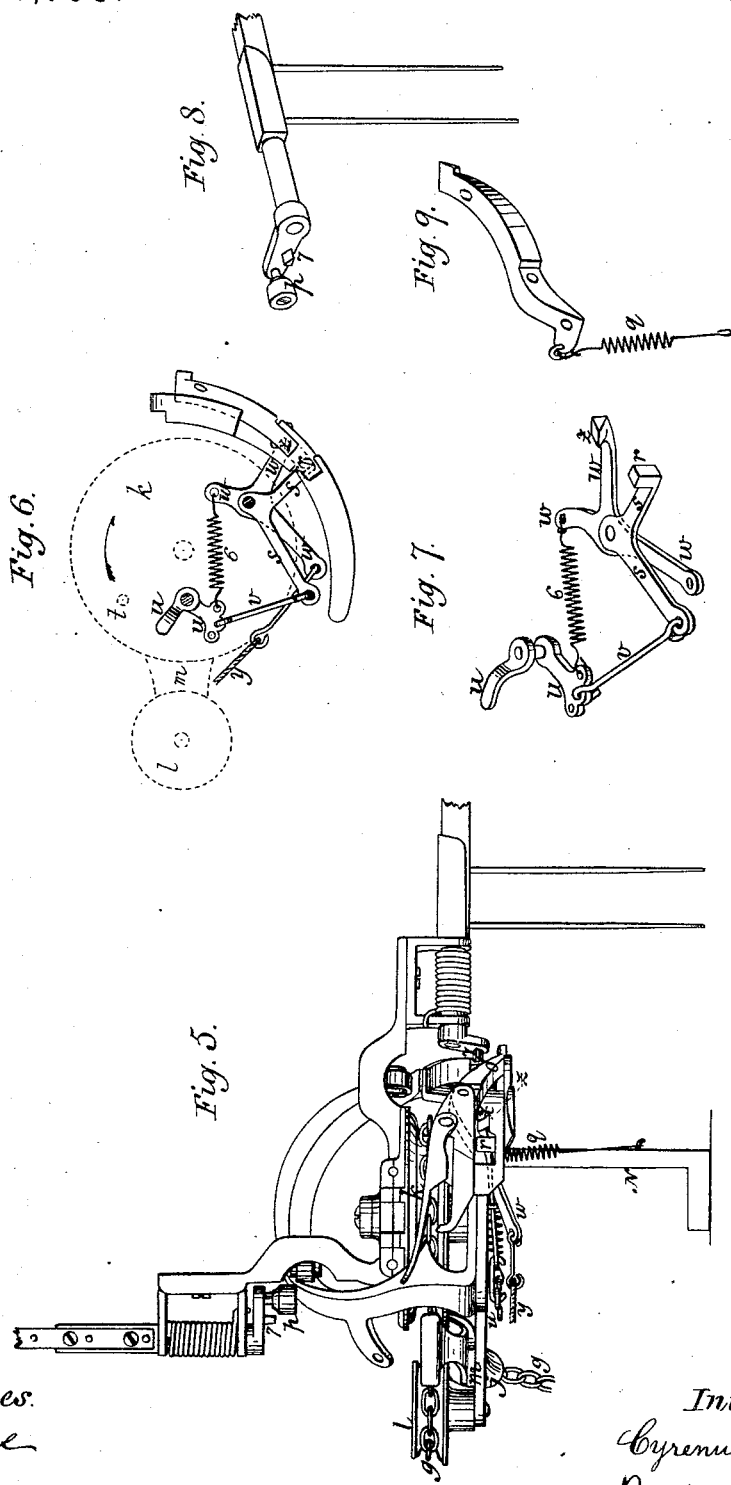

CYRENUS WHEELER, JR., OF AUBURN, NEW YORK.

IMPROVEMENT IN HARVESTER-RAKES.

Specification forming part of Letters Patent No. 163,708, dated May 25, 1875; application filed December 16, 1873.

*To all whom it may concern:*

Be it known that I, CYRENUS WHEELER, Jr., of Auburn, in the county of Cayuga and State of New York, have invented certain new and useful Improvements in Harvesting-Machines and Rakes therefor; and I do hereby declare the following to be a full, clear, and exact description thereof, reference being had to the accompanying drawings making a part of this specification, in which—

Figure 1 represents, in perspective, so much of a harvesting-machine as will illustrate my invention. Fig. 2 represents, on an enlarged scale, and detached from the machine, the chain-guide for arranging the links of the driving-chain, so as to properly fit in and against the groove or recess of the chain-wheel and drive it. Figs. 3 and 4 represent the details of the lifting and tilting lever. (Not distinctly seen in Fig. 1.) Fig. 5 represents, on an enlarged scale, the rake-operating mechanism. Figs. 6 and 7 represent locking and tripping mechanism, whereby the rakes, or any of them, are made to act as a rake or a reel at the will of the operator. Figs. 8 and 9 represent a safety contrivance, by means of which the switch is positively opened or closed before the friction-roll of the rakes arrives at said switch.

This invention consists, first, in a lifting and tilting lever, and its connection with the main frame, and with a rake-stand arranged upon a hinged shoe, so that by said lever and its connections the finger-bar, cutting apparatus, grain-table, and raking mechanism are not only tilted, but by the same act, and at the same time, raised up bodily from the ground. It further consists in a chain-guide, which arranges the links of the driving-chain for taking into or against the sprockets, projections, or recesses of the chain-wheel, and driving said wheel without liability to slip thereon. It further consists in a tripping and locking mechanism, by which the driver in his seat can sit and control the rakes, or any of them, to act as rakes or reels at will.

To enable others skilled in the art to make and use my invention, I will proceed to describe the same with reference to the drawings, first premising that the harvesting-machine in many of its parts, as well as the rake mechanism, is the same as that shown and described, and in part claimed by me, in other former patents, and I shall only particularly describe the parts which I deem new and important in this present invention, the portions not described being shown with sufficient clearness in the drawings.

On the front or tongue frame A of the machine there is a rigid standard, B, to the top of which is pivoted a bell-crank lever, $a$, separately and distinctly shown at Fig. 4, and at the point or part 1 of said bell-crank the lever C is pivoted. At and around the point where the lever C is attached to the bell-crank $a$ there is a hub, 2, and projecting from it a lug, 3, leaving shoulders where said lug joins said hub. On the end of the lever C, and facing the hub 2, there is a segmental flange or rim, 4, which takes over the hub, and which admits of the lever moving to a certain extent independently of the bell-crank—viz., until the end of the segmental flange 4 comes against the shoulder formed at the union of the lug and hub, and then the lever and bell-crank move together. To the long arm or lug 3 on the bell-crank lever $a$ is fastened one end of a rod or link, $b$, the other or rear end of which is fastened to the camway or a projecting arm, $c$, thereon; and to the short or upper arm of said bell-crank is secured a rod or link, $d$, the rear end of which is hooked over an arm or stud, 5, at the extreme rear end of the rear hinged main frame D, or to an arm, $e$, projecting still farther rearward. On the lever C is a friction-roll, $f$, which, when the front of the lever is brought down into a more horizontal position, takes against the edge of the rigid standard B, and causes said standard to serve as a fulcrum for the lever. As the lever is drawn forward and downward the rod $b$ forces the rake-stand rearward, which causes the points of the guards or front of the cutting apparatus to tilt upward, and at the same time, and by the same motion of the lever C, the rod $d$ raises up the rear of the main frame, and the shoe, platform, cutting apparatus, rake, &c., connected to the rear of said rear main frame, and thus the lifting and tilting are simultaneous.

The chain $g$, after it passes around the driving-pulley $h$ on the main axle E, whence it receives its driving motion, passes under a spring or yielding straining-pulley, *i*, under the main frame, and thence it passes into the chain-guide *j*, where the links of the chain are properly adjusted for taking into or against the recesses or projections in the groove of the rake-driving wheel or pulley *k*, so as to drive the rakes with certainty, and without slip by the wrong position of the links of the chain when they come against the chain-wheel *k*. The end of this chain-guide *j*, where the chain enters it, may be round or square, only large enough to allow the chain to freely enter it; but in the chain-guide, and before the chain passes out of it, the areal cross-section of the opening through the chain-guide is changed, so as to resemble a similar cross-section of the chain itself, as seen distinctly at Fig. 2, and this shape or form of the chain-guide arranges the links of the chain in regular and certain order for taking against the projections or recesses in the groove of the chain-wheel, and gives it a uniform motion. The chain, after it leaves the end of the chain-guide, immediately enters the groove of the chain or rake-driving wheel *k*, and, after passing around said wheel, passes around a guiding or directing pulley, *l*, to bring it in line with the driving chain-wheel *h* on the main axle; otherwise, if the chain passed directly from the wheel *k* to the wheel *h*, the strain upon the chain would pull the rake and rake mechanism out of proper position, and tend to tip up the outer end of the finger-bar, cutting apparatus, &c. The guiding and directing pulley is supported on an arm, *m*, projecting from the rake-stand N.

The switch *o*, which controls the camways that the roll *p* on the crank of the rake must take to cause it to act as a rake for clearing the platform of the cut grain, or to act only as a beater or reel-arm to draw the grain into the cutters, as the case may be, is held in its normal condition by its spring *q* pulling it down at the rear, with its front thrown up by said spring, to allow the roller to pass under it, in which event the arm carrying that roller becomes a rake and clears the platform; but as that roller passes around, it strikes against the downwardly-bent rear end of the switch *o*, raising up said rear end and depressing the front end, and while the rear end of the switch is up, the dog *r* of the spring-trigger *s* flies in under the rear end of the switch, and holds it so that the spring *q* cannot act, and in this position of the switch the roll on the crank of the arms will run up over the top of the switch, and that arm will be a reel or beater only, and not a rake. As the rake-wheel revolves, a pin, *t*, in it, Fig. 6, strikes against the tail of the bell-crank lever *u*, and this, through the link *v*, pulls the dog *r* out from under the switch, and then the spring *q* acts to throw upward the point of the switch and cause the next arm to act as a rake, and so the change from a rake to a reel, or vice versa, is automatic, and would be regular and continuous. Now, it often happens that the regular changes from reel to rake, or rake to reel, are not desirable; and for this purpose, and to put it in the power of the operator to break up or alter this continuous change, and cause the rake to act as beaters or reels only, I have arranged a locking mechanism, (shown at *w*,) which is inactive until the operator places his foot upon the treadle *x*, to which one end of the cord *y* may be fastened, or until he draws upon said cord, which is also fastened to the locking mechanism *w*, and so pulls a wedge-shaped piece, *z*, of the locking mechanism under the tail or rear end of the switch *o*, and though the pin *t* may draw out the trigger *s* and its dog *r* from under the tail of the switch, yet the latter cannot drop, as the lock or wedge *z* is still under it. When the operator wants the rake to act as a rake, and also to clear the platform, he releases the cord *y*, and then the spring *b* draws the lock *z* from under the switch, and its spring again pulls it down at the rear, and throws up the point, in which case, the rolls going under the switch, the arm acts as a rake and clears the platform. It sometimes happens that the switch does not fully open or close the camway, but stands with its point midway between its extreme movements; and if in this position the roll should strike it at about the center of the roll, so that the point would neither fly up or down, something must give way and break. To prevent this I place upon the rake-cranks, and in advance of the rolls *p* thereon, a wedge-shaped piece, 7, which coming to a knife-edge, as the switch also does, they could not strike so as not to yield, for whether the wedge 7 passes under or over the point of the switch, it would raise or lower said point, so that the roll could not strike it centrally, and then the roll itself would move it out of the way and thus avoid breakage. The locking lever or mechanism *w* is inactive except when the operator draws upon the cord *y*, and then it comes into action. Now, by taking out the pin *t* in the rake-driving wheel, which is made removable for that purpose, and attaching cord *y* to the trigger *s*, the driver can control the rakes or beaters at will, instead of their being worked automatically. By drawing out the trigger the tail of the switch is drawn down and its point flies up. In this position the camway that causes the beater to act as a rake is open, and as the roll of the rake passes under the tail of the switch it raises up the tail, and the trigger *s* flies in under it, holding it up and its point down, until the operator draws upon the cord *y*, to shift the rake-roller onto the other camway. Thus the rakes and beaters may be automatically worked and changed, or be worked and changed entirely at the will of the driver.

Having thus fully described my invention, I would state that I have made an application for a patent conjointly with Henry J. Case, and of even date herewith, in which a different combination of devices for a some- what similar purpose is claimed. I admit priority of invention in said joint application, and here disclaim the combination therein claimed; but What I do claim is—

1. In combination with the lever C and its bell-crank $a$, the connecting-rods $b$ $d$, the former attached to the track of the rake-stand, or to a rigid piece connected thereto, and the latter attached to the rear end of the main frame, or a projection thereon, for the purpose of lifting and tilting the cutting apparatus at one and the same operation, substantially as described.

2. The chain-guide $j$, with a free entrance for the chain at its front, and an opening at the other end, where the chain passes onto the rake-driving wheel, said opening corresponding in form to a cross-section of the chain, for the purpose of arranging the links of said chain in proper order to take the projections or recesses in the drive-wheel, as described and represented.

3. In combination with the automatic tripping mechanism $s$ $t$ $u$ $v$, for holding and releasing the switch $o$, the locking mechanism $w$, under the control of the driver, for the purpose of holding the switch in one position when desirable to do so, without regard to the automatic tripper, as and for the purpose described.

4. The cord $y$, when attached to the tripping mechanism $s$, in combination with the switch $o$ and rollers $p$ on the rake-arms, for the purpose of changing the rake-operating or shifting mechanism from automatic to one entirely under the control of the driver, as described.

C. WHEELER, JR.

Witnesses:
CHAS. O'BRIEN,
THOS. TOWNE.